United States Patent [19]

McNelley et al.

[11] Patent Number: 5,639,151

[45] Date of Patent: Jun. 17, 1997

[54] PASS-THROUGH REFLECTIVE PROJECTION DISPLAY

[76] Inventors: Steve H. McNelley, 29677 Woodlake Ct., San Juan Capistrono, Calif. 92675; Jeffrey S. Machtig, 23971 Crescent St., Lake Forest, Calif. 92630

[21] Appl. No.: 602,336

[22] Filed: Feb. 16, 1996

[51] Int. Cl.$^6$ .................................................. G03B 21/14
[52] U.S. Cl. ................................ 353/98; 353/10; 348/15
[58] Field of Search .................................. 353/72, 73, 74, 353/75, 77, 78, 98, 99, 119, 122, 28, 10; 359/629, 630, 636, 631; 379/52, 202; 348/14, 15, 20

[56] References Cited

U.S. PATENT DOCUMENTS

| | | |
|---|---|---|
| 2,420,198 | 5/1947 | Rosenthal . |
| 2,727,427 | 12/1955 | Jenkins ............................ 353/28 |
| 3,755,623 | 8/1973 | Cassagne . |
| 4,018,519 | 4/1977 | Clapp ............................ 353/28 |
| 4,400,725 | 8/1983 | Tanigaki . |
| 4,821,307 | 4/1989 | Flint, III . |
| 4,928,301 | 5/1990 | Smoot . |
| 5,117,285 | 5/1992 | Nelson et al. . |
| 5,159,445 | 10/1992 | Gitlin et al. . |
| 5,181,122 | 1/1993 | Ooishi ............................ 353/37 |
| 5,194,955 | 3/1993 | Yoneta et al. . |
| 5,243,413 | 9/1993 | Gitlin et al. . |
| 5,276,524 | 1/1994 | Inoue et al. ............................ 353/37 |
| 5,278,681 | 1/1994 | Gitlin et al. . |
| 5,317,450 | 5/1994 | Kamon . |
| 5,400,069 | 3/1995 | Braun et al. ............................ 348/20 |
| 5,406,323 | 4/1995 | Tanigaki et al. ............................ 348/15 |
| 5,438,357 | 8/1995 | McNelley ............................ 348/15 |
| 5,491,743 | 2/1996 | Shiio et al. ............................ 348/14 |

FOREIGN PATENT DOCUMENTS 63-228890   9/1988   Japan .

OTHER PUBLICATIONS

Shinichi Shiwa, et al. *Digest*, "A Large–Screen Visual Telecommunication Device Enabling Eye Contact", SID 91, pp. 327–328.

A. Rodney Wellens, *Behavior Research Methods & Instrumentation*, "A device that provides an eye–to–eye video perspective for interactive television", 1978 vol. 10(1), pp. 25–26.

3M "Optical Systems Light Control Film", date unknown.

Steven P. George, et al. *Eyesaver International, Inc.*, "Private Eye", date unknown.

*Primary Examiner*—William Dowling
*Attorney, Agent, or Firm*—Price, Gess & Ubell

[57] ABSTRACT

An improved desktop projection display system which effectively utilizes desk top space by producing an image that appears to be at the rear edge of the desk. The display is compact because it uses a transparent-reflective panel (i.e., beamsplitter) to reflect a screen image through the same space occupied by the projection beam. This is achieved by projecting through a transparent-reflective panel, angled at approximately 45 degrees to the projection beam, onto a front projection screen located on the desk surface. An image formed on the front projection screen is then reflected by the transparent-reflective panel creating the appearance to the observer that the reflected front projection screen is positioned toward the rear of the desk surface. This invention greatly improves desktop display ergonomics for large display viewing by providing a sufficient distance between the observer seated at a desk and the display image. It is also possible to position a camera behind the transparent-reflective panel at the apparent position of the reflected screen image thus ensuring teleconferencing eye contact. The present invention, though ideal for desk top use, may also be incorporated into devices such as laptop computers or configured in kiosks or used in a manner similar to big screen projection televisions.

31 Claims, 5 Drawing Sheets

PASS-THROUGH REFLECTIVE PROJECTION DISPLAY

BACKGROUND OF THE INVENTION

1. Field of the Invention

The present invention concerns the area of projection display systems and, more specifically, a compact desktop display that provides a large image and enables eye contact while video teleconferencing.

2. Description of Related Art

The information age has transformed and is transforming the very nature of society, including how work is done and the way humans relate to each other. Fiber optic and satellite data transmission, new data compression methods, high speed modems, and powerful personal computers are all accelerating this transformation. This new information age is fundamentally linked to the increasing use of various display technologies for viewing the digital world on television and computer screens.

The ergonomics of desktop computing has been an important consideration in the design of personal computers and computer work stations for some time. In spite of this, there remains at least one significant obstacle to overcome. That obstacle stems from the computer user's demand for larger and larger displays for the desktop, while current display technology is unable to provide an ergonomically sound solution to this demand. Current displays are excessively bulky to be conveniently placed on a desk top. A 35-inch diagonal CRT (cathode ray tube) monitor occupies the entire desk, as do rear projection devices with similar viewing areas. These bulky displays render installations ergonomically unsound because the viewing surface of the screens are placed mere inches away from the user. The close proximity of these large displays makes viewing of the entire display at a single glance impossible and causes severe neck and eye strain because of the physical movement required to scan the entire display.

Flat panel displays offer the potential for a far superior large display for desktop computing because the flat panel display can be positioned to the rear of the desk away from the user, thus allowing the user to both enjoy the entire large picture in a single glance without the physical strain of extreme neck and eye movements. Despite the promise of large flat panel display technology, their consumer availability remains uncertain. This is particularly the case with large flat panel displays of 35 inches diagonally and greater. The technologies currently proposed by electronics manufacturers suffer from the problems of low brightness, poor resolution, limited viewing angle, and poor contrast, to name only a few. Even with these problems resolved, the high projected price for large flat panels may well prove prohibitive for most consumers.

With the merging of television and computer, the demand for larger displays will only increase. A larger display for the desk top naturally provides more involving CD-ROM game experiences, easier to view windows while multitasking and greater detail in graphics and diagrams. Beyond these immediate advantages, a large desktop computer display could also provide ideal ergonomics for quality video-conferencing. Studies have shown that conferees feel much more engaged in the conference when the image of the distant party is life size. Unfortunately, as video-conferencing improves due to a larger display, the ergonomics of eye contact between conferees is made worse by the larger display.

A fundamental problem with all video-conferencing is the lack of eye contact between conferees. This problem, known as the parallax problem, is caused by a camera being placed at the perimeter of the display so as to not obstruct the viewing of the display. In this arrangement a local conferee looks into the display to view the distant conferee, but when he does so he fails to look directly into the camera. Hence, a camera placed above the display causes the conferee to appear to be looking down. This problem is so exacerbated by large displays where the distance between the camera and the center of the display is maximized that the video conference seems extremely awkward and unnatural.

Numerous eye contact technologies have been proposed. U.S. Pat. No. 5,278,681 to Gitlin teaches the use of a flat panel liquid crystal projection screen with a camera mounted behind the viewing surface. This technology relies on projectors resulting in a bulky housing due to the required "throw" distance of the projector. Also, it seems unlikely that such a display could ever be configured into large panels. The most common approach to solve the eye contact problem is to use a transparent-reflective panel, i.e. a beamsplitter, positioned at a 45-degree angle relative to the viewing surface of the display. The camera in this arrangement is placed at right angles to the display and is aimed toward the transparent-reflective panel to capture the reflection of the conferee as he peers through the transparent-reflective panel to the display beyond. Although quality eye contact can be achieved when this system is used with a large display on a desk top, the transparent-reflective panel extends far beyond the edge of desk into the space normally occupied by the conferee.

Prior Art Desktop Displays

Prior art FIG. 1 demonstrates the poor ergonomics of a conventional rear projection screen placed on a desk top. A rear projection screen 6 is positioned toward the front edge of a desk 2. As a result an observer seated at the desk is forced to strain to view a large image produce on the rear projection screen 6. Typically in rear projection housings a mirror 8 is used to "fold" the optical path to shorten the apparent focal distance of a projector 8.

Likewise, prior art FIG. 2 demonstrates that a CRT display 10 on the desk 2 also suffers from poor ergonomics. Most desktop computer systems use CRT monitors ranging from about 12 to about 20 inches diagonal. Even at 20 inches, diagonal CRT displays begin to suffer from having the display screen too close to the position of the seated observer. The CRT display 10 is shown in FIG. 2 with its viewing surface near the front edge of the desk. In such an arrangement a computer operator cannot view the entire picture at a single glance, and eye strain and neck strain result because of the extreme movements necessary to scan the entire viewing surface. For larger displays, such as 35 inches diagonal, the bulky CRT display 10 can even extend over the edge of the desk 2 almost into the lap of the observer.

Prior art FIG. 3 illustrates a flat panel display 12 on the desk 2. The flat panel display 12 can be positioned toward the rear of the desk. At the rear of the desk a 35-inch diagonal image is sufficiently far from the observer seated at the desk to allow the observer to take in the entire image in single glance and scan the image without a fatiguing amount of eye and neck movement. Although the observer-to-image distance is ideal when the flat panel display 12 is used, several problems remain in the way of practical flat panel display 12 use. The first and most apparent problem is that flat panel technology has yet to mature to high quality large images similar to those of the cathode ray tube. This leads to another problem with large flat panel display technology; that is, the ongoing technical development may take many years before such displays are available to the consumer. Still, another problem, if and when large flat panels are available for consumers' purchase, their price is likely to be far too high for the vast majority of consumers to afford. Lastly, a primary thrust in the near future for large desktop displays will be video teleconferencing. All the flat panel technologies now in development, as far as the inventors know, do not permit eye contact between conferees without major technological modifications. The use of a transparent-reflective panel angled in front of the flat panel display 12 at 45 degrees with a camera capturing the reflection of the conferee will provide quality eye contact. Unfortunately, the flat advantage of the flat panel display 12 is diminished by the increased depth of the display due to the desk space taken up by the angled transparent-reflective panel.

OBJECTS AND SUMMARY OF THE INVENTION

It is an object of the present invention to provide a compact projection display system that permits a projected image to appear to be at the rear of the display;

It is a further object of this invention to provide a teleconferencing eye contact projection display for convenient desktop use;

It is a still further object of the present invention to use image blocking film to conceal the image of a front projection screen from direct view;

It is a further object of the present invention to provide a display that has electronic components that are removable and useable separate from the display;

It is a further object of the present invention to provide a contrast enhancement to the image reflection of an image on a front projection screen;

It is a further object of the present invention to provide a desktop system employing a front projection screen having three-dimensional relief;

It is a further object of the present invention to provide a display that is collapsible into a transportable unit; and It is an additional object of the present invention to provide a desktop concave front projection screen that enables an imaged person on that screen to turn and have simulated eye contact with its observers throughout a wide field of view.

These and additional objects are met by a projection display system which is both compact and produces an image that appears to be at the rear of the device. The display is compact because it uses a transparent-reflective panel to reflect a screen image through the same space occupied by the projection beam. This is achieved by projecting through a transparent-reflective panel, angled at approximately 45 degrees to the projection beam, onto a front projection screen located on a desk surface. An image formed on the front projection screen is then reflected by the transparent-reflective panel, creating the appearance to the observer that the reflected front projection screen is positioned toward the rear of the desk surface. This invention greatly improves desktop display ergonomics for large display viewing by providing a sufficient distance between the observer seated at a desk and the display image. It is also possible to position a camera behind the transparent-reflective panel at the apparent position of the reflected screen image thus ensuring teleconferencing eye contact. The present invention, though ideal for the desktop use, may also be incorporated into devices such as a laptop computer or configured in a kiosk or used in a manner similar to big screen projection televisions.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved projection display system that passes a projection beam through a transparent-reflective panel and onto a front projection screen wherein a screen image is reflected by the transparent-reflective panel for viewing.

Pass-Through Reflective Projection Display

Figure 1:
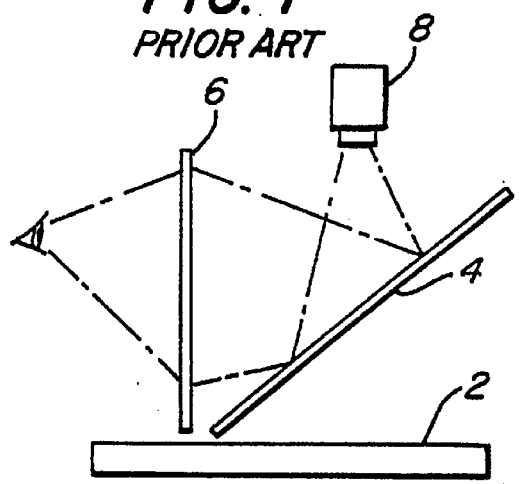
FIG. 1 illustrates a prior art rear projection display on a desk top.
Figure 2:
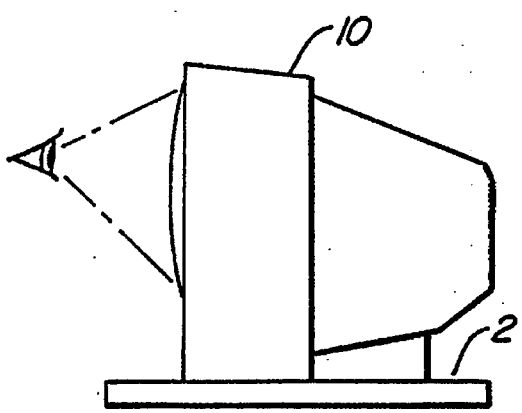
FIG. 2 illustrates a prior art cathode ray tube display on a desk top.
Figure 3:
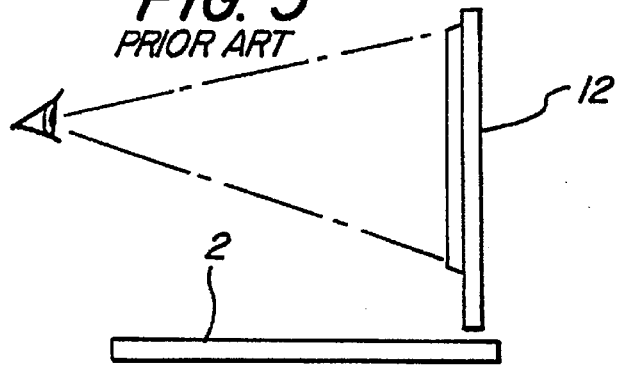
FIG. 3 illustrates a prior art flat panel display on a desk top.
Figure 4:
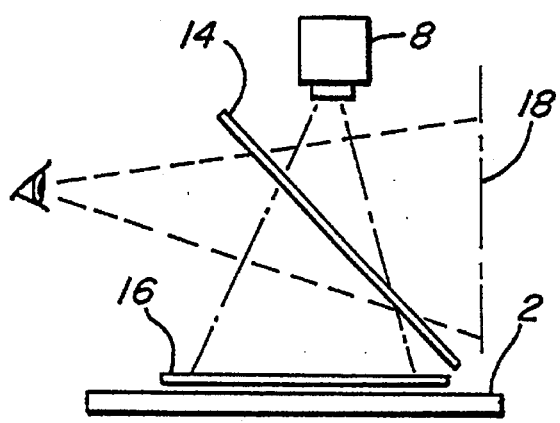
FIG. 4 illustrates the present invention on a desk top.

FIG. 4 is a side view of the present invention. Light from a projector 8 passes through a transparent-reflective panel 14 and onto a front projection screen 16. The transparent-reflective panel 14 is positioned at approximately 45 degrees to the front projection screen 16. The transparent-reflective panel 14 can be positioned at steeper or shallower angles relative to the front projection screen 16, depending upon the exact position of the observer. An image from the front projection screen 16 is reflected by the transparent-reflective panel 14, resulting in a reflected image 18 that appears to the observer to be positioned at the rear of desk 2. The entire display is compact because the projection throw occurs in the same space as the reflected image 18 on the transparent-reflective panel 14. Essentially, the depth (distance from front edge to rear edge) of most desks is fixed and limited. However, the distance from the desk surface to the ceiling of the room is usually much greater than the depth of the desk. The projector 8 uses part of this greater vertical distance as its "throw" distance or focal distance. The transparent-reflective panel 14 then reflects the image from the front projection screen 16 so that the greater vertical distance is transformed into a "virtual" or illusory distance from the transparent-reflective panel 14 to the rear edge of the desk top. In other words, the apparent depth of the desk top can be greater than the actual depth of the desk top. This invention permits a large display up to 35 inches diagonal or greater to be viewed on the desk 2 with sufficient distance between the observer and the reflected image 18. The display provides both practicality and improved ergonomics.

Figure 5:
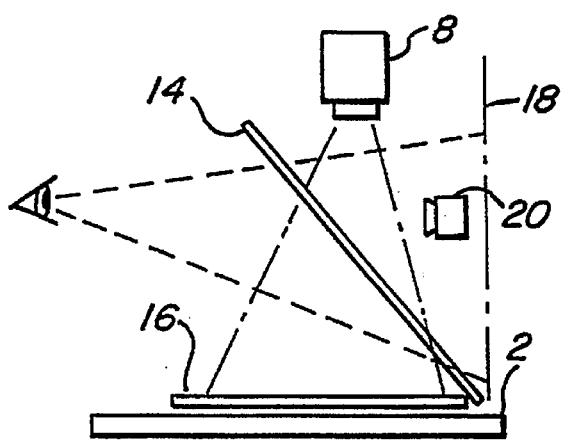
FIG. 5 illustrates the present invention on a desk top with a camera positioned for teleconferencing eye contact.

Another fundamental aspect of the present invention is seen in FIG. 5. Here a teleconferencing camera 20 is placed behind the transparent-reflective panel 14 and aimed toward the observer. The invention operates the same as described for FIG. 4, but also takes advantage of the transparency of the transparent-reflective panel 14 so that conferees can have eye contact while conferencing, because by looking directly at the reflected image 18 of a distant conferee, a local conferee also looks directly into the camera 20. The invention combines all necessary ergonomic principles needed for a high quality teleconferencing experience. Those principles include a large life-size image of the distant conferee, a large display image positioned far enough back to enjoy the entire display while seated at desk 2, and eye contact between conferees, assuming both the local and the distant conferees each have a terminal comprising the present invention.

Figure 6:
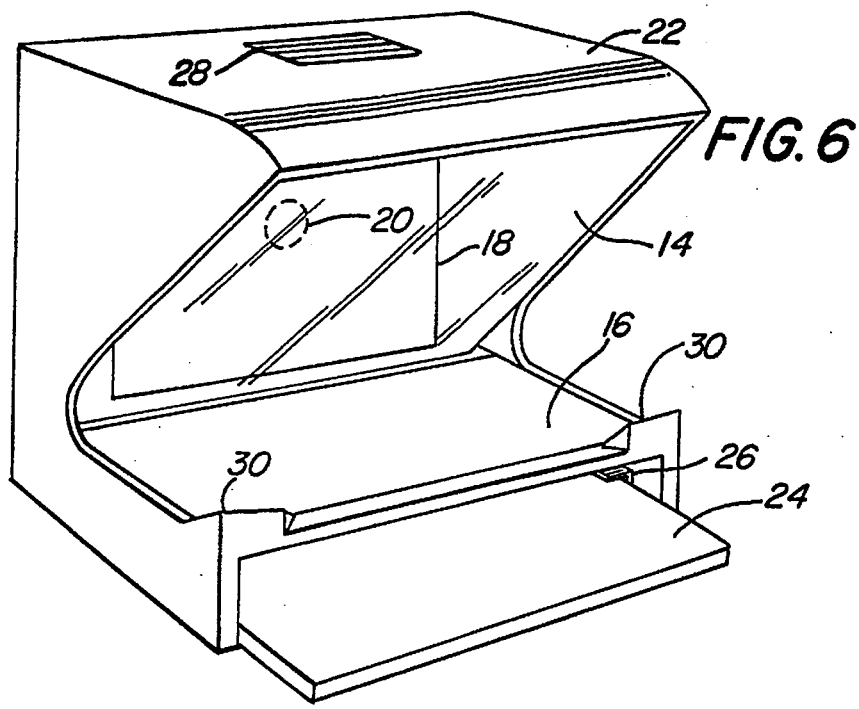
FIG. 6 illustrates a perspective view of the present invention configured with a housing.

FIG. 6 is a perspective drawing in the preferred configuration of the present invention. A housing 22 supports the transparent-reflective panel 14 and the front projection screen 16. The reflected image 18 is seen on the transparent-reflective panel 14 behind which camera 20 is positioned. Speakers 30 are aimed toward the transparent-reflective panel 14 so that sound will appear to originate from the center of the reflected image 18. This is especially desirable when video teleconferencing because the voice of the imaged conferee appears to originate from the imaged conferee's mouth. Additionally, an extension table 24 is attached to a sliding track 26. The extension table, when opened, allows a computer operator to easily access a keyboard (not shown) and, when the extension table 24 is retracted, the keyboard is concealed underneath the front projection screen 16. An air intake duct 28 is seen at the top of the housing 22 which provides circulation for the projector 8 and the camera 20.

Figure 7:
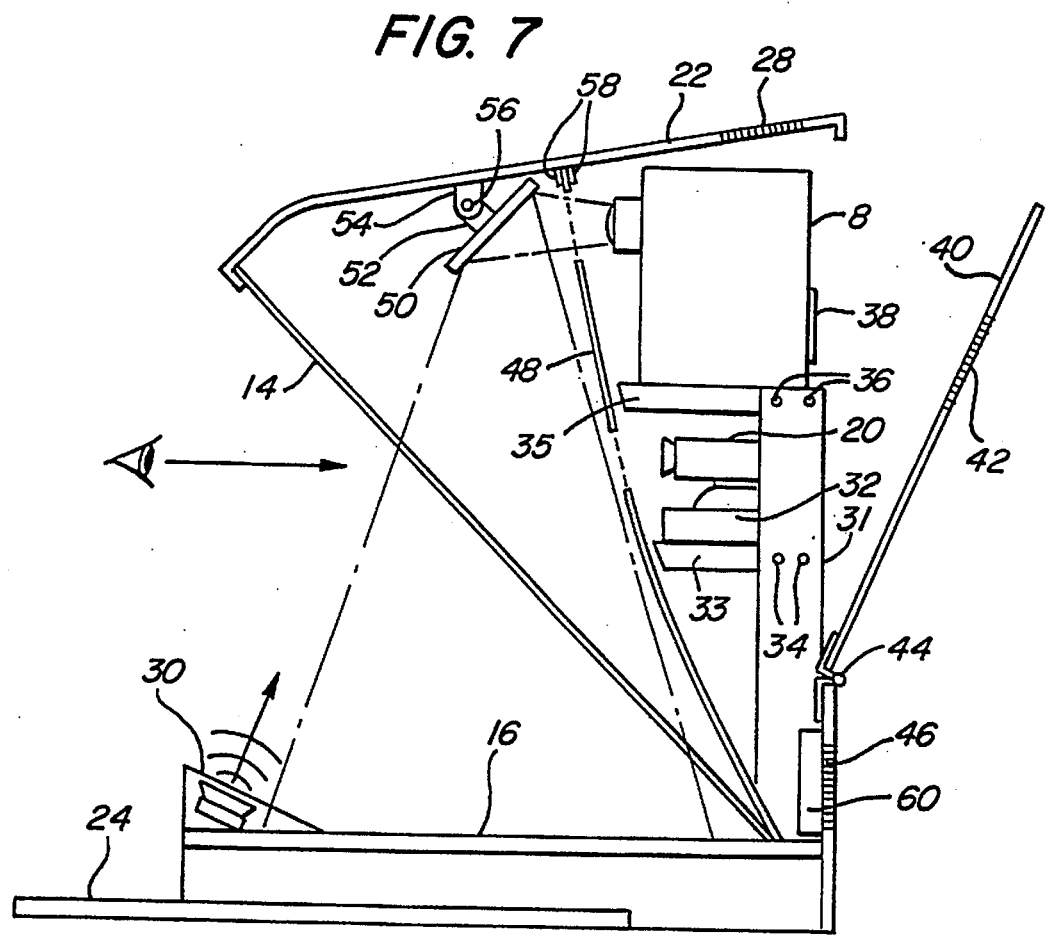
FIG. 7 illustrates a side cut-away view of FIG. 7 and illustrates a removable projector and camera.

FIG. 7 is a side cut-away view of the configuration of FIG. 6. Air circulation is provided by fan 60 with an out-take air duct 46. Additionally, a designated projector air duct 42 is provided on a door 40 so that when the door 40 is closed it matches a projector air duct 38. The door is attached to the housing 22 by a hinge 44. Camera 20 rests on camera ledge 33, which is attached to main support 31 by rivets 34. The camera 20 is shown attached to a motorized aiming base 32, which can be remotely controlled by the observer. The projector 8 rests on projector ledge 35, which is attached to the main support 31 by rivets 36. The projector 8 is aimed onto a first surface mirror 50 which is positionable by a housing extension 54 that is movably attached to front surface mirror bracket 52 by a stiff ball hinge 56. The speaker 30 is shown aimed toward the transparent-reflective panel 14 so that sound appears to originate from the center of the transparent-reflective panel 14.

A black mat 48, such as black velvet, is placed behind the transparent-reflective panel 14 and in front of the camera 20 and projector 8. The black matt 48 is held in place by a housing mat clip 58. Holes in the black mat 48 (designated by broken lines in FIG. 7) permit the camera to capture an image through the transparent-reflective panel 14 and allows the projector light to pass to the first surface mirror 50. The black mat 48 can significantly improve contrast of the reflected image 18. The image on the front projection screen 16 can be washed out in part by ambient light. However, when the reflected image 18 is viewed against the background of the black mat 48, contrast is restored. Of course, the black mat 48 can be replaced by black paint applied to the projector and camera and everything else behind the transparent-reflective panel 14. The black mat 48 is clearly optional and is not necessary in many configurations of the present invention. A highly futuristic appearing display should have as little as possible behind the transparent-reflective panel 14 so that it is transparent to the observer. In such a case the projector 8 can be positioned above the transparent-reflective panel 14, or beneath the transparent-reflective panel 14 hidden in the desk 2 leaving only the camera 20, or perhaps a mirror (not shown) from which the camera captures a reflection, behind the transparent-reflective panel 14.

The configuration of FIGS. 6 and 7 illustrates one possible arrangement so that the consumer can easily access the projector 8 and the camera 20. By removing projector 8 the consumer can use the projector for front projection home theater or for business presentations. The camera 20 can be a camcorder and, when removed, be used for making videos as well as for document imaging as a part of a teleconference. The flexibility of the present invention, with its critical components having multiuse capabilities, offers significant cost savings for the consumer. The projector 8 and camera 20 could also be accessed from the top or from the side or the transparent-reflective panel 14 could fold out of the way (all not shown). Those skilled in the art will readily understand the design possibilities for removable components. Also, a computer, a microphone and other components not mentioned can also be installable and removable from the housing of the present invention.

Many of the housing design options in the present invention depend upon the ambient light level and the type of front projection screen 16 used. Ideally, the front projection screen 16 is protected from as much ambient light as possible. To reduce ambient light in the housing configuration of FIGS. 6 and 7 side walls can be added. An overhang from the top of the housing over the screen will also reduce ambient light levels. Even more effective is to mount the front projection screen 16 facing down toward the desk 2 with the projector 8 aimed upwards. This inverted arrangement (see FIG. 10) protects the front projection screen 16 from light of the ceiling mounted lights. Likewise the current invention may be configured on its side, thereby blocking out side light as from a window. If a housing design is preferred that is more open in its design, a front projection screen 16 made from a high gain screen material (i.e., beaded or polarizing) can enhance screen image brightness, and thereby also enhance the brightness of the reflected image 18. Parabolic-shaped front projection screens also will enhance brightness. The present invention can be readily upgraded to take advantage of the continuing advances in front projection screen technology that constantly improve image brightness.

The projector 8 can be any type of projection device; however, certain technologies offer great advantages. Three-tube CRT projectors produce high quality and adequately bright images, yet suffer from excessive bulk, the requirement of convergence, and the absence of practical portability. Liquid crystal display (LCD) projectors have made great strides in recent years. Whether of a one-panel or a three-panel design, the brightest is now exceeding 600 ANSI lumens, which is more than sufficient for the present invention. LCD projectors also have the advantage of being in a small package, which makes them ideal for serving as a removable component in the present invention. Also, Texas Instruments' digital Micro-mirror Device (DMD) is now becoming commercially available and shares the same advantages as LCD projectors, but promises brightness levels in consumer products of well over 1000 ANSI lumens.

The transparent-reflective panel 14 of the present invention is essentially the same as a beamsplitter; however, no light beam is actually divided as the panel is both transmitting and reflective but to different light beams. Those in the optical coating art will understand the vast variations possible for the transparent-reflective panel 14 in regard to its substrate, coating, and manufactured process. Both plastic and glass substrates, as well as stretched mylar, have been successfully used for the transparent-reflective panel 14. The transparent-reflective panel 14 can range from a custom blend of optical coatings on a transparent substrate for superior reflectivity and transmissivity all the way down to off-the-shelf one-way mirrors with inconsistent and poor optical qualities. Also, the reflectivity and transmissivity, as well as other optical qualities of the transparent-reflective panel 14, can be adjusted as required.

The transparent-reflective panel 14 should have sufficient transparency to allow the camera 20 to capture a quality image from the opposite side and to allow projected light to pass through without substantial reflection. The transparent-reflective panel 14 must also be substantially reflective so that a quality image is reflected from the front projection screen 16. Antireflective coatings can be applied as needed to suppress unwanted reflections from any of the optical surfaces involved. On the back side of the transparent-reflective panel 14, opposite the viewing side, an antireflection coating can serve to eliminate the ghosting effect apparent with many types of transparent-reflective panels. Despite the vast variations possible for the transparent-reflective panel 14, the property of being both reflective and transparent remains the single most important constant.

The following description will allow the construction of the present invention using off-the-shelf components and custom plastic fabrication. A pass-through reflective projection display was built in a configuration similar to that of FIGS. 6 and 7. A housing was constructed out of black acrylic plastic with an aluminum armature to hold the projector and camera in place. A 35-inch front projection screen was constructed by forming a sheet of acrylic plastic into a subtle parabola to which was spray glue mounted a Da-Lite glass bead high gain front projection screen. The parabolic screen shape was used because it improves image brightness. The camera was an ELMO CCD miniature camera Model TSN 402 which was attached to the aluminum armature behind the transparent-reflective panel. The projector was a SHARP XG-E 1000U mounted behind the transparent-reflective panel and aimed toward two first surface mirrors that directed the projection beam through the transparent-reflective panel onto the front projection screen. The transparent-reflective panel was a transparent glass with special optical coatings made by EYESAVER International, Norwell, Mass., Model No. AR68C2, 68% transmission conductive coating on two sides for radiation reduction. The glass was selected for this application because of its superior quality in permitting transmission of the projection beam without substantial reflection while still providing a quality reflection from the front projection screen. One surface of this special glass is noticeably more reflective, and this side was installed facing the front projection screen 16. The glass was cut 33 inches wide and 28 inches high and then mounted into the acrylic plastic housing. The glass used as the transparent-reflective panel was positionable to simulate tilting the image reflection up and down for comfortable viewing. The terminal was operated in a compressed video (MPEG) teleconferencing system.

Figure 8:
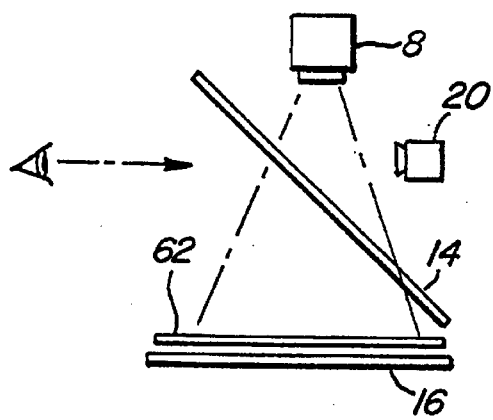
FIG. 8 illustrates the present invention with image blocking film.

FIG. 8 illustrates the use of image blocking film 62 with the present invention. An observer using the present invention can simultaneously directly view the front projection screen 16 and the reflected image 18 on the transparent-reflective panel 14. The direct view of the front projection screen 16 is a distraction while the observer attempts to pay attention to the reflected image 18. However, this problem is minimal with many types of front projection screens that have a narrow viewing angle. Even so, directional image blocking film is an important part of the present invention, allowing a variety of configurations. Image-blocking film is available from several vendors and can be based on a number of different technologies. Whether the film is plastic or glass, the image blocking film as it is presented here is a material that permits transmission of a image from at least one direction and reduces or eliminates the image from at least one other direction. 3M Inc., EYESAVER International, and Optical Coating Laboratories, Inc (San Diego, Calif.). are just a few of the companies that manufacture image blocking films that can be used with the present invention. The image blocking film can also be an array of tiny microlouvers supported, for example, by their ends. In that case the image blocker would not actually be a "film," but would fall within the bounds of this configuration of the present invention.

As illustrated in FIG. 8, the light from the projector 8 passes through the image blocking film 62 to the front projection screen 16. An anti-reflective coating may need to be applied to or above the image blocking film 62 so that the maximum amount of light from the projector 8 reaches the front projection screen 16. Although the image blocking film 62 is shown in FIG. 8 parallel to the front projection screen 16 it may also be positioned at an angle. Another method for blocking a direct view of the front projection screen 16 is to position the image blocking film 62 so that the observer looks through the film to see both the transparent-reflective panel 14 and the front projection screen 16. Essentially, the observer looks "straight" through the film 62 to view the transparent-reflective panel 14, but the observer looks at an angle to view the front projection screen 16, thus bringing into play the special properties of the image blocking film 62. This arrangement may also be applied to the other teleconferencing displays.

Figure 17:
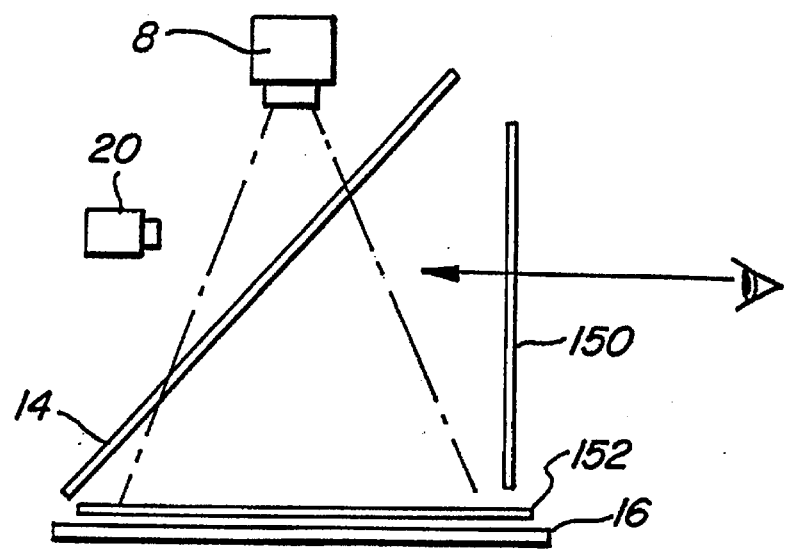
FIG. 17 illustrates the present invention utilizing crossed polarizers to obscure the image on the front projection screen from the direct view of the observer.

Another method of blocking the direct view of the front projection screen 16 has been developed by the present inventors. FIG. 17 illustrates the use of a first polarizer 152 positioned above the front projection screen 16 and a second polarizer 150 positioned so that the observer must look through the second polarizer 150 to view the first polarizer and the transparent-reflective panel 14. By properly aligning the two polarizers 150, 152 the reflected image 18 can be observed while direct view of the front projections screen 16 is obscured.

The proper alignment can be obtained by adjusting the angle of one of both of the polarizers 150, 152. As with the directional image blocking film 62, the light from the projector 8 passes through the first polarizer 152 onto the front projection screen 16. The first polarizer 152 is shown as parallel with the front projection screen 16, but it may be positioned at an angle instead. An additional polarizer behind the transparent-reflective panel 14 (not shown) or as part of the optical coating of the transparent-reflective panel 14 may help enhance the clarity of the reflected image 18 while fully obscuring from view the front projection screen 16.

Figure 18:
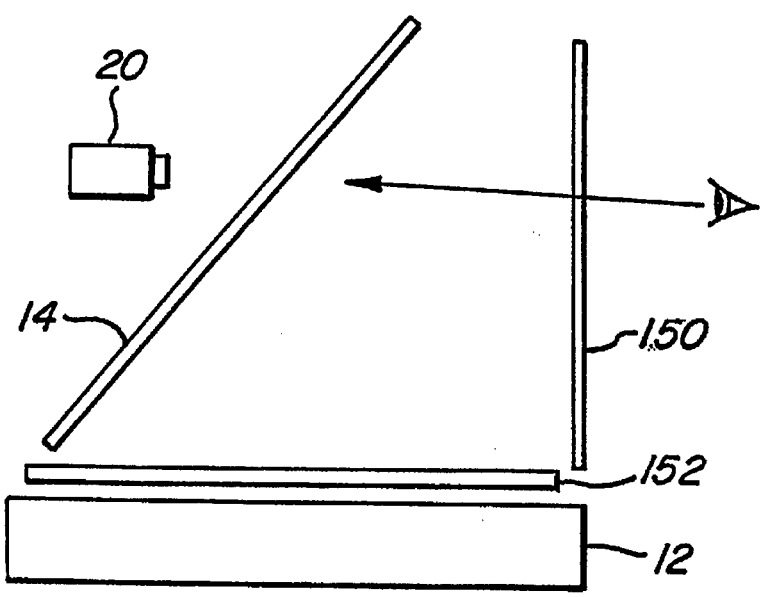
FIG. 18 illustrates the use of crossed polarizers to block the direct view of a flat panel display from an observer viewing a reflection of the display from a transparent-reflective panel.

The present inventors have also demonstrated the use of polarizers and a transparent-reflective panel in a teleconferencing mode without the projector 8 by replacing the front projection screen 16 with a CRT or a flat panel display. FIG. 18 shows a flat panel display 12 facing the transparent-reflective panel 14. The observer glances through the second polarizer 150 to see the transparent-reflective panel 14. The flat panel display 12 is blocked from the view of the observer by the crossed alignment of the two polarizers 150, 152.

Figure 9:
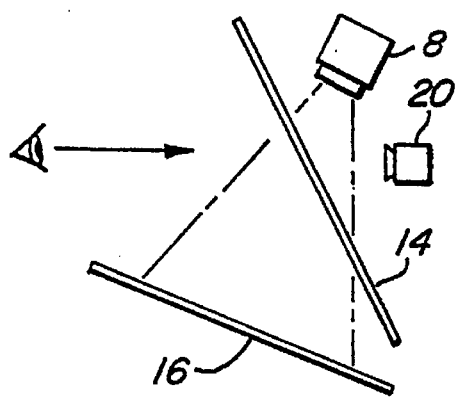
FIG. 9 illustrates the present invention with the front projection screen angled to conceal the screen from the observers' view.
Figure 10:
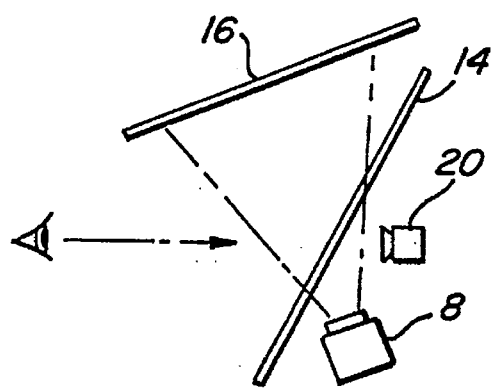
FIG. 10 illustrates the present invention with the front projection screen aimed downward and angled to conceal the screen from the observers' view.

An additional method of blocking the front projection screen 16 from the direct view of the observer is to tilt the front projection screen 16, as is seen in FIG. 9. Titling the screen at the back reduces and even eliminates the viewing of the front projection screen 16 from the perspective of the observer. Likewise, FIG. 10 illustrates the screen aimed downward, but at an angle that conceals the front projection screen 16 from the observer's view.

Figure 11:
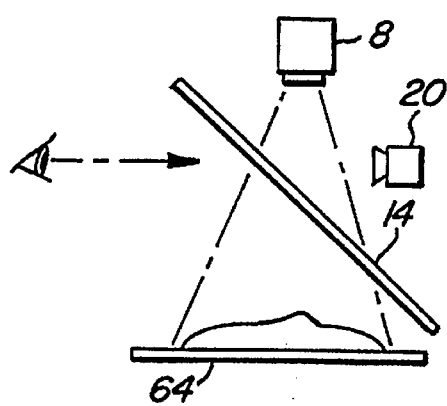
FIG. 11 illustrates a front projection screen that is dimensional with a convex shape.

The present invention is also configurable with unique from projection screens that are shaped in three dimensions. FIG. 11 illustrates the projector 8 projecting onto a convex-shaped screen 64. The convex-shaped screen 64 can be formed in the shape of the human head. When the image of a human head is projected onto this screen, the head will appear to be three-dimensional when viewed in the reflected image 18. Instead of a human head, objects can also be configured into the convex-shaped screen 64.

Figure 12:
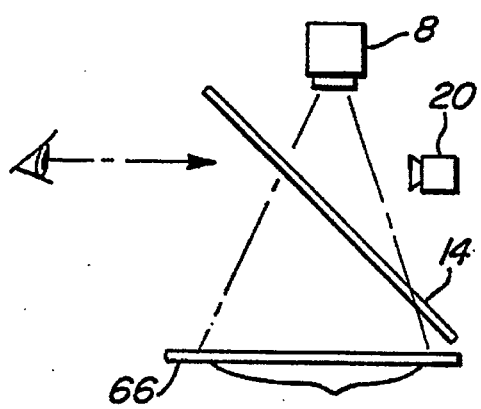
FIG. 12 illustrates a front projection screen that is dimensional with a concave shape.

FIG. 12 shows a similar dimensional screen that is a concave-shaped screen 66. When a face image is projected onto the concave-shaped screen 66 configured in the shape of the human head, the observer will perceive the head turning as the observer moves. This phenomenon of a concave screen can also be used to create the appearance of moving objects. A screen can also be configured in any combination of convex, concave, and two-dimensional areas (not shown).

The Applicants have invented a unique concave dimensional front projection screen that simulates eye contact between the imaged person on the screen and the observers of the screen. This forms the subject of a separate copending United States Patent application. In brief, concave front projection screens that are shaped to mirror the actual proportions of the human head will not permit eye contact between an imaged person and local observers, even over a narrow field of view. With these lifelike-shaped concave screens, the imaged person appears to look off to the side rather than directly at the observers.

Figure 15:
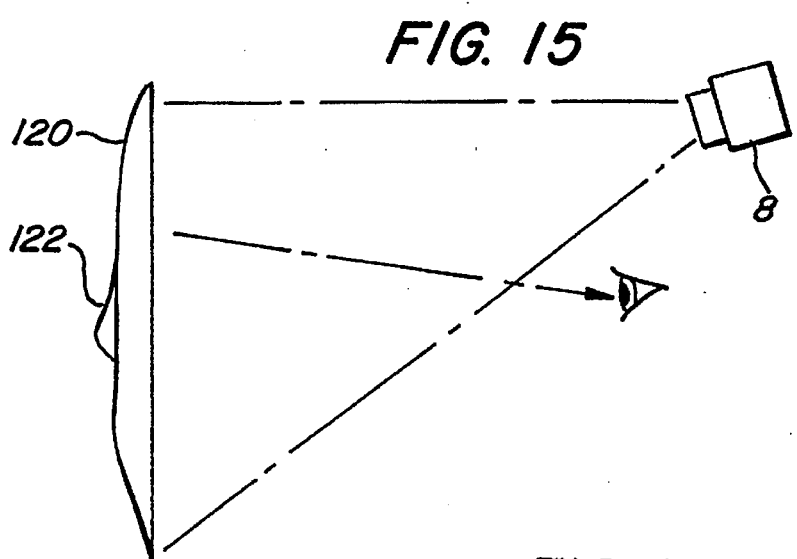
FIG. 15 illustrates a concave front projection screen that permits an imaged person in that screen to turn and have simulated eye contact with its observers.
Figure 16:
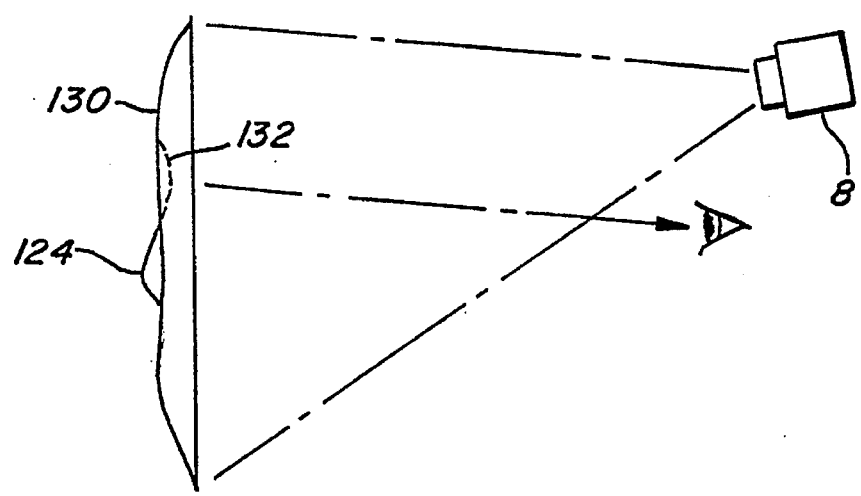
FIG. 16 illustrates a concave front projection screen that permits an imaged person in that screen to turn with increased mobility and have simulated eye contact with its observers.

FIGS. 15 and 16 illustrates concave front projection screens invented by the Applicants that are shaped in extremely narrow concave parabolas and permit the imaged person projected on the screens to turn accurately to track its observers and thereby provide simulated eye contact. This concave front projection screen technology is ideally suited for improved display communication including video teleconferencing and thereby benefits greatly when integrated into the pass-through reflective technology of the present invention.

FIG. 15 illustrates a eye contact concave front projection screen 120 that permits an imaged person on that screen to turn and engage its observers with eye contact through out a wide field of view. Although the screen 120 has three-dimensional relief so as to resemble a frontal view of a human head, the relief is much shallower than an actual facsimile of a human head; a nose area 122 is especially shallow. Shallow impressions of other features can be added to enhance the movement of those features. FIG. 16 illustrates a increased mobility eye contact concave front projection screen 130. This screen is formed to allow the head to move subtly independent of the eyes to add a more dynamic appearance to the illusory movement of the imaged person. Eye contact is maintained in this slightly deeper concave screen by adding a convex eye area 132 for each eye. A shallow nose 124 is only one of several features that can be formed to give the appearance of movement to images on this screen.

Figure 13:
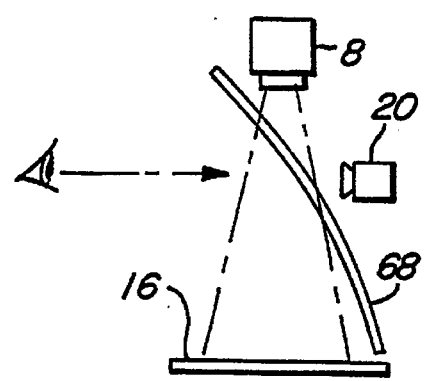
FIG. 13 illustrates a bowed transparent-reflective panel that permits the expansion of the image reflected from the front projection screen.

FIG. 13 illustrates a variation of the present invention with a bowed transparent-reflective panel 68. The advantage of the bowed transparent-reflective panel 68 is that it expands the image of the front projection screen 16. A squeezed image, deformed either by manipulating the signal or using a specialized projection lens, is projected onto the front projection screen 16 and expanded to its normal shape by the bowed transparent-reflective panel 68. This enables the front projection screen 16 to be smaller which, for example, has the advantage of providing a larger image and can save desk top space.

Skilled persons in the art will recognize the variations possible by combining aspects of the present invention revealed in FIGS. 6–13 and 17. Although these figures are shown with the camera 20, they may also be understood without camera 20. The eye contact capability of the present invention is significant, but no less so than the unique improvements of a compact display with a large rear positioned image made possible by pass-through reflective projection technology.

Figure 14:
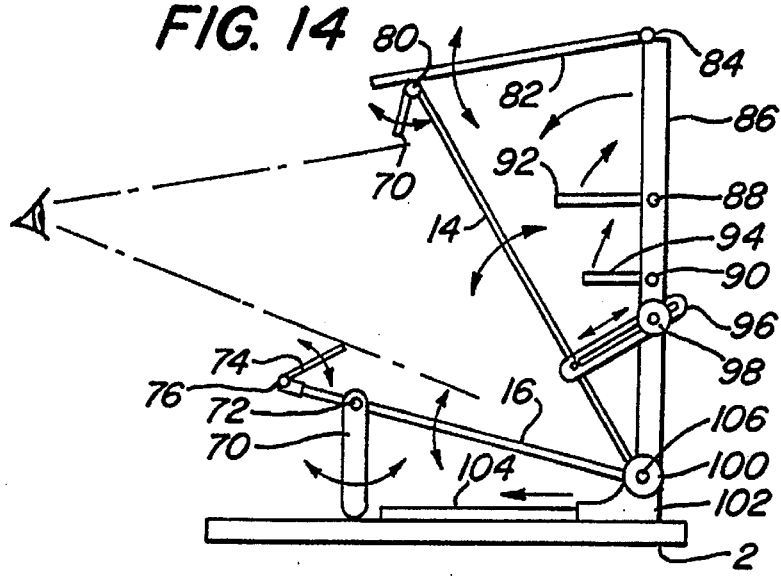
FIG. 14 illustrates the present invention in a collapsible configuration.

FIG. 14 illustrates an embodiment of the present invention that can be collapsed into a thin transportable unit. The projector 8 and the camera 20 have been removed. The main frame 86 is fixedly attached to base 102 which has connected to it vertical support leg 104. Extending from a main rotation hinge 106 is projected the screen 16 and the transparent-reflective panel 14 held in place by tightening knob 100. An adjustment leg 70 is attached to the front projection screen 16 by a stiff leg hinge 72, which allows vertical and horizontal adjustment. The transparent-reflective panel 14 is adjusted by a groove piece 96 which is tightened in position by a groove knob 98.

To close the unit up a folding projector ledge 92 held in place by rivet 88 and a folding camera ledge 94 held in place by rivet 90 are each folded onto the main frame 86. The front projection screen 16 and the transparent-reflective panel 14 are each folded up to the main frame 86. The housing hood 82 folds down onto the main frame 86 by means of a hood hinge 84. A screen ledge 74 is attached to a screen ledge hinge 76 and is positionable to block the view of the front projection screen 16 form the observers' perspective. A top ledge 78 is attached to a top ledge hinge 80 and is positionable to block reflections on the transparent-reflective panel 14 above where the reflected image 18 ends. Similar adjustments to can be added to control reflections on the transparent-reflective panel 14 beyond the sides of the image 18 (not shown).

Depending upon the type of the transparent-reflective panel 14 and the degree of transmissivity used, adjustments to the light sensitivity of the camera 20 may help improve image quality. Also, adjustments to the brightness of the projector 8 and front projection screen 16 improves the brightness of the reflected image 18 on some types of the transparent-reflective panel 14. Such light sensitivity and brightness adjustments of the camera 20 and the projector 8 and the type of front projection screen 16 will be apparent procedures to one of ordinary skill in the art.

As is the case with all eye contact terminal technology, true eye contact cannot occur between conferees unless both conferees have an eye contact terminal. Even if only one conferee has an eye contact terminal, that conferee can transmit a eye contact signal for at least the other conferee to enjoy. In a multiple conferee session, portions of the screen can be designated for simultaneously displaying incoming conferees. A more complex approach to multiple conferees is to use multiple cameras side by side in order to transmit different point of view of the conferees as if sitting around a table. Although not shown, it will be obvious as to how side-by-side cameras would be configured behind the transparent-reflective panel 14.

Because the front projection screen 16 is reflected from the transparent-reflective panel 14, the image will appear to the observer as being reversed (i.e., a mirror image of reality). Image reversal techniques (either physical such as a mirror or electronic) can overcome this problem by appropriately reversing the image so that when the image reflection 18 is seen on the transparent-reflective panel 14 the image will assume its correct viewing orientation. Electronic reversal control is a common feature on most projectors. Another minor distortion of the reflected image 18 is its trapezoidal or "keystoned" appearance which is common to most projection displays. This can be corrected either through image manipulation or optical projection techniques.

When viewing the image reflection 18 from the sides, the image reflection will appear to fall off the edge of the transparent-reflective panel 14 beyond a certain viewing angle. To widen the viewing angle this can problem can be simply remedied by using a wider transparent-reflective panel 14.

Many camera aiming and positioning mechanisms have also been adapted to the present invention. Motorized positioning and aiming systems with remote controls may be used. Also, various auto-tracking systems can allow the conferee to remain framed in the camera even when actively moving about. The camera 20 can be aimed to the side or upward, either directly or by means of movable mirrors, onto hard copy for document imaging. Special slots or clips can be provided as part of the housing to hold copy pages in place. The camera 20 can also be connected to the transparent-reflective panel 14 so that if the transparent-reflective panel is tilted the camera 20 aiming direction is automatically adjusted. The camera 20 can also be mounted in a position not directly behind the transparent-reflective panel 14. In such a case mirrors or a image conduit (i.e., optical fiber bundle) can redirect the image through the transparent-reflective panel 14 to the camera 20.

The drawings show the transparent-reflective panel 14 disposed between the projector 8 and the front projection screen 16. It will be apparent to one of ordinary skill in the art that the significant point is that the projector 16 be positioned so that its projected image beam passes through the transparent-reflective panel 14 to reach the front projection screen 16 where it forms a visible image. The simplest configuration is to position the projector 8 as shown in the figures. However, the projector 8 may also be positioned to the side of the transparent-reflective panel 14, or in some other suitable position, as long mirrors or other optical components are provided to redirect the projected beam of light to strike the transparent-reflective panel 14 from a side opposite the side of the panel 14 facing the front projection screen 16. In that case the optical component used to redirect the projected beam of light acts as a surrogate for the projector 8.

Additional teleconferencing components may be included as desired in terminals configured with the present invention. The camera 20 may be configured with remote controls. Lights can also be added as desired to enhance image capture quality. Lights may also be placed behind the transparent-reflective panel 14 so long as they do not interfere with the image reflection 18. Microphones can be integrated into various terminal configurations of the present invention. Like the speakers 30, the microphones can advantageously be aimed so that sound bounces off the transparent-reflective panel 14. The addition of optical coatings and films may also be used, including, but not limited to radiation reduction filters, color filters, and contrast enhancers, and glare guard and viewing angle privacy technologies. Also, three-dimensional projection and screen technologies and fresnel lenses that expand the reflected image 18 will readily integrate with this invention. The current invention may also be sold as a kit. This will allow the consumer to mix and match components and housing designs to suit his or her individual needs. Other modifications will become apparent as new teleconferencing, camera, computer, and projection technology appear.

Of course, the teleconferencing terminal used as part of the current invention can be, and preferably is, a multipurpose personal computer with a graphical interface such as Windows 95. Therefore, the graphical interface can be used to place calls, select views, etc. That is, if a conference call is undertaken between several conferees, the conferees can be selected to occupy the entire image reflection 18 by choosing the conferees' window using a keyboard, a mouse, a touch screen, or similar user input means. The computer, whether used for teleconferencing or not, can be integrally part of the housing design of the present invention and can be designed to easily removed such as in the case of a docking port for a laptop computer.

Those skilled in the art will appreciate that various adaptations and modifications of the just-described preferred embodiments can be configured without departing from the scope and the spirit of the invention. Therefore, it is to be understood that, within the scope of the appended claims, the invention may be practiced other than as specifically described herein.

What is claimed is:

1. A pass-through reflective projection display system comprising:

projector means for projecting an image beam;

a front projection image screen for making the image beam visible as an image; and a transparent-reflective panel disposed so the image beam from the projector means strikes the transparent-reflective panel and is transmitted therethrough to reach the front projection image screen forming a visible image, the transparent-reflective panel angled relative to the front projection image screen for reflecting the visible image formed thereon so that an observer gazing toward a front projection image screen-facing side of the panel will perceive a reflection of the visible image as appearing at a distance beyond the transparent-reflective panel.

2. The display system as defined in claim 1 further comprising a speaker for sound reproduction wherein the speaker is disposed on a side of the transparent-reflective panel from which the observer views the image and wherein the speaker is aimed towards the transparent-reflective panel so that sound produced by the speaker is reflected by the panel and seems to emanate from the reflection of the image.

3. The display system as defined in claim 1, wherein the front projection image screen is formed with three-dimensional relief.

4. The display system as defined in claim 1, wherein the transparent-reflective panel is bowed so as to alter proportions of the reflection of the front projection image screen.

5. The display system as defined in claim 1, wherein apparent contrast of the reflection is enhanced by providing a light absorbing background against which the observer views the reflection the background disposed on a side of the transparent-reflective panel opposite the observer.

6. The display system as defined in claim 1, wherein a directional image blocker is disposed between the front projection image screen and the transparent-reflective panel to obscure the image on the front projection image screen when the observer looks directly at the front projection image screen.

7. The display system as defined in claim 1, wherein a first polarizer is disposed between the front projection image screen and the transparent-reflective panel and a second polarizer is disposed between the observer and the transparent-reflective panel to obscure the image on the front projection image screen when the observer looks directly at the front projection image screen.

8. The display system as defined in claim 1 further comprising a camera disposed on a side of the transparent-reflective panel opposite the observer for obtaining an image of the observer.

9. The display system as defined in claim 1 further comprising a substantially opaque housing, the housing being substantially open along a surface thereof to allow the observer to view the front projection image screen-facing surface of the panel.

10. The display system as defined in claim 9, wherein the housing further comprises means for collapsing the housing into a compact unit for transporting the display system.

11. The display system as defined in claim 9, wherein the projector means comprises a projector removably mounted within the housing and wherein the housing further comprises means for removing the projector for use independent of the display system.

12. The display system as defined in claim 9 further comprising a camera disposed on a side of the transparent-reflective panel opposite the observer for obtaining an image of the observer, wherein the camera is removably disposed within the housing and wherein the housing further comprises means for removing the camera for use independent of the display system.

13. A pass-through reflective projection display system with a video conferencing eye contact feature comprising:

projector means for projecting an image beam;

a front projection image screen for making the image beam visible as an image;

a transparent-reflective panel disposed so the image beam from the projector means strikes the transparent-reflective panel and is transmitted therethrough to reach the front projection image screen forming a visible image thereon, the transparent-reflective panel angled relative to the front projection image screen for reflecting the visible image so that an observer gazing toward a front projection image screen-facing side of the panel will perceive a reflection of the visible image as appearing at a distance beyond the transparent-reflective panel; and a camera disposed on a side of the transparent-reflective panel opposite the observer for obtaining an image of the observer.

14. The display system as defined in claim 13 further comprising a speaker for sound reproduction wherein the speaker is disposed on a side of the transparent-reflective panel from which the observer views the image and wherein the speaker is aimed towards the transparent-reflective panel so that sound produced by the speaker is reflected by the panel and seems to emanate from the reflection.

15. The display system as defined in claim 13, wherein the front projection image screen is formed with three-dimensional relief.

16. The display system as defined in claim 13, wherein the transparent-reflective panel is bowed so as to alter proportions of the reflection of the front projection image screen.

17. The display system as defined in claim 13, wherein apparent contrast of the reflection is enhanced by providing a light absorbing surface against which the observer views the reflection, the background disposed on the side of the transparent reflective panel opposite the observer.

18. The display system as defined in claim 13, wherein a directional image blocker is disposed between the front projection image screen and the transparent-reflective panel to obscure the image on the front projection image screen when the observer looks directly at the front projection image screen.

19. The display system as defined in claim 13, wherein a first polarizer is disposed between the front projection image screen and the transparent-reflective panel and a second polarizer is disposed between the observer and the transparent-reflective panel to obscure the image on the front projection image screen when the observer looks directly at the front projection image screen.

20. The display system as defined in claim 13 further comprising a substantially opaque housing, the housing being substantially open along a surface thereof to allow the observer to view the front projection image screen-facing surface of the panel.

21. The display system as defined in claim 20, wherein the housing further comprises means for collapsing the housing into a compact unit for transporting the display system.

22. The display system as defined in claim 20, wherein the projector means comprises a projector removably mounted within the housing and wherein the housing further comprises means for removing the projector for use independent of the display system.

23. The display system as defined in claim 20, wherein the camera is removably disposed within the housing and wherein the housing further comprises means for removing the camera for use independent of the display system.

24. A reflected image projection display system comprising:

projector means for projecting an image beam;

a screen for making the image beam visible as an image, the screen having three-dimensional relief for modifying the visible image; and a transparent-reflective panel disposed so the image beam from the projector means strikes the transparent-reflective panel and is transmitted therethrough to reach the screen forming a visible image, the transparent-reflective panel angled relative to the image beam for reflecting the visible image so that an observer gazing toward a screen-facing surface of the panel will perceive the visible image as appearing at a distance beyond the transparent-reflective panel.

25. The image projection display system of claim 24 further comprising a camera disposed on a side of the transparent-reflective panel opposite that facing the observer for obtaining an image of the observer viewing the display.

26. A reflected image projection display system comprising:

projector means for projecting an image beam;

a screen for making the image beam visible as an image;

a transparent-reflective panel disposed so the image beam from the projector means strikes the transparent-reflective panel and is transmitted therethrough to reach the screen forming a visible image, the transparent-reflective panel angled relative to the image beam for reflecting the visible image so that an observer gazing toward a screen-facing surface of the panel will perceive the visible image as appearing at a distance beyond the transparent-reflective panel; and image blocking means to obscure the image on the screen when the observer looks directly at the screen.

27. The image display of claim 26, wherein the image blocking means is provided by a directional image blocking film disposed between the transparent-reflective panel and the screen.

28. The image display of claim 26, wherein the image blocking means is provided by a first polarizer disposed between the transparent-reflective panel and the screen and a second polarizer disposed between the observer and the transparent-reflective panel.

29. The image display of claim 26, wherein the image blocking means is provided by angling the screen away from the observer.

30. The image display system of claim 26 further comprising a camera disposed on a side of the transparent-reflective panel opposite that facing the observer for obtaining an image of the observer viewing the display.

31. The display system as defined in claim 26, wherein an adjustable ledge shields the screen from direct view.

* * * * *